Oct. 19, 1948. F. R. WOODWARD 2,452,009
WELDING APPARATUS
Filed May 21, 1946

WITNESSES:
Edward Michaels
F. V. Giolma

INVENTOR
Foster R. Woodward.
BY
G. M. Crawford
ATTORNEY

Patented Oct. 19, 1948

2,452,009

UNITED STATES PATENT OFFICE 2,452,009

WELDING APPARATUS

Foster R. Woodward, Pleasant Ridge, Mich., assignor to Westinghouse Electric Corporation, East Pittsburgh, Pa., a corporation of Pennsylvania Application May 21, 1946, Serial No. 671,214

8 Claims. (Cl. 219—4)

My invention relates generally to welding apparatus, and it has reference in particular to resistance welding apparatus.

Generally stated, it is an object of my invention to provide a resistance welding machine that is simple and inexpensive to manufacture and is easy to operate.

More specifically, it is an object of my invention to provide for controlling the energization of the welding electrodes in a resistance spot welding machine in accordance with predetermined pressure conditions between the electrodes.

It is also an object of my invention to provide a resistance spot welding machine wherein the application of electrical power to the electrodes is prevented before the necessary pressure is applied to the work between the welding electrodes.

Yet another object of my invention is to provide for operating a control switch to energize the welding electrodes in response to predetermined deformation of a pressure applying member.

A further object of my invention is to provide for using a bifurcated spot welding electrode support with a control switch actuated in accordance with predetermined deformation of one of the bifurcations relative to the other.

Still another object of my invention is to provide for movably supporting the lower electrode of a resistance spot welding machine on a bifurcated support and for applying pressure to the electrodes through one of the bifurcations by means of a toggle linkage.

An important object of my invention is to provide for adjustably supporting the stationary electrode of a resistance welding machine by clamping it to a vertical column in different operating positions, and for pivotally supporting the other electrode for providing relative movement between the electrodes.

Other objects will in part be obvious, and will in part be explained hereinafter.

In practicing my invention in one of its forms, the upper electrode of a resistance welding machine is secured to an arm which is adjustably clamped to a vertical support secured in insulated relation to the frame of the machine. The lower electrode is secured to one end of a pivoted support arm which is bifurcated at the other end to provide upper and lower fork portions. A toggle linkage connects the upper fork portion to a pressure applying pedal and a control switch is mounted on the lower fork portion so as to be actuated in response to relative deformation of the forks to effect energization of the welding electrodes only after a predetermined electrode pressure has been attained.

For a more complete understanding of the nature and scope of my invention, reference may be made to the following detailed description which may be studied in connection with the accompanying drawing in which.

Figure 1:
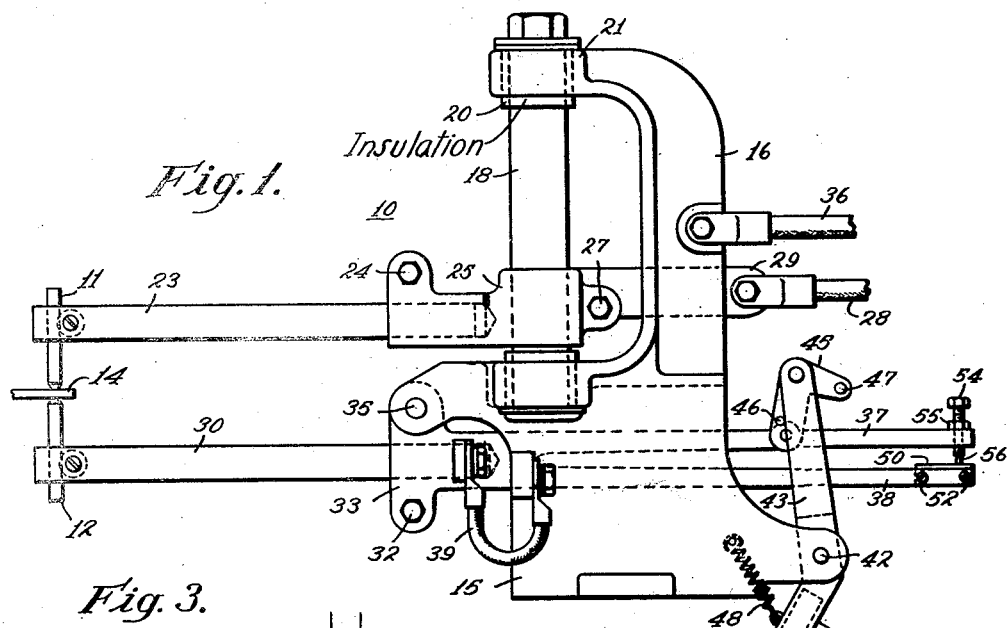
Figure 1 is a side elevational view of a resistance spot welding machine embodying the invention in one of its forms.

Referring to Fig. 1, the reference numeral 10 may denote generally a resistance spot welding machine wherein relatively movable spot welding electrodes 11 and 12 may be supported for relative movement for performing welding operations on work 14 which may be positioned therebetween.

The welding machine 10 may comprise generally an upright frame 15 having a substantially vertical yoke 16 arranged for securing an upright column 18 in insulated relation therewith. Insulated collars 20 may be interposed between the column 18 and the frame of the machine for electrically insulating them from each other. The upper electrode 11 may be secured to a substantially horizontal support arm 23 which may be clamped by means of a bolt 24 in an adjustable clamp 25 mounted on the column 18. The clamp 25 may be of a split construction and provided with a bolt 27 for securing it to the column in different vertical operating positions. Electrical connection may be made to the upper electrode 11 by means of a suitable conductor 28, which may be connected to a projecting lug 29 on the clamp 25.

The lower electrode 12 may be secured to a substantially horizontal lower support arm 30 which may be secured by means of a bolt 32 in a pivotal support 33 which may be pivotally secured to the base 15 by means of a hinge pin 35. The pivotal support 33 may be bifurcated substantially horizontally so as to provide upper and lower forks 37 and 38 extending to the rear of the frame 15 in spaced vertical relation. Electrical connections may be made to the lower electrode 12 by means of a conductor 36 connected to the frame and a flexible shunt 39.

Welding pressure may be applied to the electrodes 11 and 12 by means of a foot pedal 40 which may be pivotally mounted on the base 15 by means of a hinge pin 42 and provided with an upright lever arm 43 projecting above the upper fork of the movable support arm 30. The lever 43 may be connected to either of the forks, being for example connected to the upper fork 37 by means of a toggle link 45. The link 45 may be provided with projecting stops 46 and 47 for engaging opposite sides of the lever arm 43 to prevent overtravel of the toggle link in its different operating positions. A spring 48 may be provided for normally restoring the foot pedal 40 to the non-operating position.

In order to provide for controlling the energization of the electrodes 11 and 12, means such as the control switch 50 may be provided. The control switch may be of any suitable construction and if the pedal 40 is connected to the upper fork 37, may be mounted on the lower fork 38 by means of screws 52. Means, such as the adjusting screw 54, which may be provided with a lock nut 55 may be utilized for engaging the operating plunger 56 of the control switch 50 to actuate the switch when the upper fork 37 is deformed a predetermined amount relative to the lower fork 38 upon the application of welding pressure from the foot pedal 40.

Figure 3:
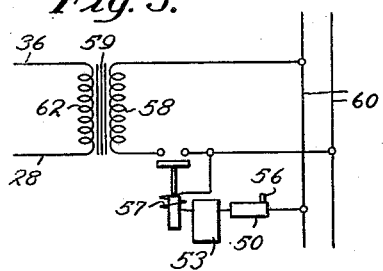
Fig. 3 is a diagrammatic view of a circuit arranged for controlling the energization of the electrodes of the machine shown in Figs. 1 and 2.
Figure 2:
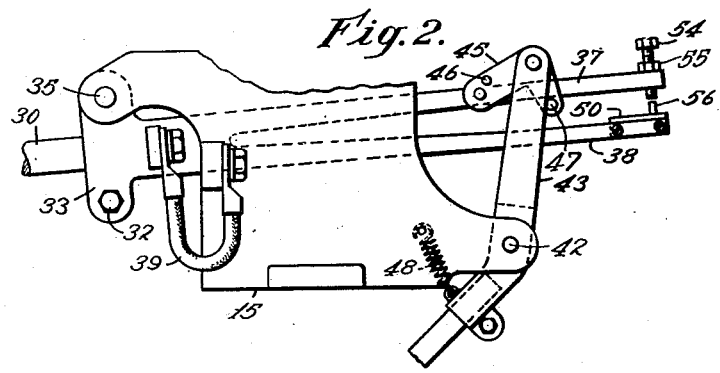
Fig. 2 is a partial side elevational view of the machine shown in Fig. 1 with the lower electrode support in a non-operating position.

Referring to Fig. 3, it will be seen that the control switch 50 may be utilized to control a weld timer 53 to effect operation of a line switch 57 which connects the primary winding 58 of a welding transformer 59 to a source of electrical energy represented by the conductors 60. The secondary winding 62 of the welding transformer 59 may be connected to the welding electrodes 11 and 12 by means of conductors 36 and 28.

Since deformation of the upper fork 37 relative to the lower fork 38 of the pivotal support 33 is proportional to the welding pressure exerted between electrodes 11 and 12, energization of the electrodes may be effected at any predetermined value of welding pressure by adjusting the screw 54 to operate the control switch 50 when the desired welding pressure is applied. Accordingly, when the work 14 is positioned between the electrodes 11 and 12, the application of welding current thereto is effectively prevented until the foot pedal 40 has been operated to depress the upper fork 37 and apply the desired welding pressure between the electrodes. As soon as the desired welding pressure is obtained, the control switch 50 will be actuated to effect energization of the electrodes for performing the welding operation.

From the above description and the accompanying drawing, it will be apparent that I have provided a resistance welding machine which is both simple and inexpensive to manufacture and is reliable and safe in operation. By pivotally supporting the movable electrode by means of a bifurcated support in the manner hereinbefore described, the application of welding current before the necessary welding pressure is obtained is prevented. A simple and foolproof construction is thus provided which precludes burning of the work from the application of welding current before the proper welding pressure is obtained. This result is particularly beneficial in connection with the use of fluid pressure devices for controlling the application of welding pressure, since the failure of the source of fluid pressure may in some instances result in the application of welding current with abnormally low values of electrode pressure.

Since certain changes may be made in the above described construction and different embodiments of the invention may be made without departing from the spirit or scope thereof, it is intended that all the matter contained in the above description and shown in the accompanying drawing shall be considered as illustrative and not in a limiting sense.

I claim as my invention:

1. In a resistance welding machine, a fixed electrode, a relatively movable electrode, a movable support having rigidly connected bifurcated portions and arranged to support the movable electrode at one end, means actuating the movable support to produce welding pressure between the electrodes, and switch means responsive to predetermined deformation between the bifurcated portions of the support controlling energization of the electrodes.

2. A resistance welding machine comprising, a pair of welding electrodes, a frame having a substantially vertical column supported in insulated relation thereto, a stationary support for one of the electrodes secured to the column for vertical adjustment, a relatively movable support for the other electrode comprising a member having integral bifurcated portions at one end, said movable support being pivotally mounted in the frame in operating relation with the stationary support, a lever mechanism so connected to apply pressure to the movable support as to effect deformation of one bifurcation relative to the other, and switch means responsive to predetermined deformation of the one bifurcation of the movable support under the application of pressure operable to effect energization of the electrodes.

3. A resistance welding machine comprising, a frame having a base with a transverse opening therethrough and a vertical column positioned over the opening in insulated relation with the base, an upper electrode arm slidably mounted on the vertical column for supporting an upper welding electrode, a lower electrode arm pivotally mounted in the opening in the frame for supporting a lower electrode at one end in movable relation to the upper welding electrode, said lower electrode arm being bifurcated at the other end to provide upper and lower forks, means including a toggle mechanism connected to the upper fork and arranged to apply a downward force thereto, and switch means responsive to relative movement of the forks operable to effect energization of the electrodes.

4. In a resistance welding machine, an upper support arm, a lower electrode supported at one end of a pivoted lower support which is divided at the other end into upper and lower fork projections in spaced relation, a lever mechanism connected to one of the forks for moving the lower electrode into operating relation with the upper electrode, and switch means supported on one of the forks actuable in response to relative movement of the forks to control energization of the electrodes.

5. A spot welding machine comprising, an upper electrode supported by a relatively stationary support arm, a lower electrode movably supported at one end of a support which is bifurcated adjacent the other end to provide upper and lower forks and which is pivotally mounted intermediate the ends, means including a pivoted pressure lever and a connecting link connected to the upper fork to apply a downward pressure, and a control switch mounted on the lower arm and disposed to be actuated upon predetermined relative movement of the forks to effect energization of the electrodes.

6. In a welding machine, a pair of welding electrodes, relatively movable supports for the electrodes, one of said supports being bifurcated, means including a lever mechanism applying pressure to one of the supports to produce a predetermined pressure between the electrodes, and switch means operable in response to predetermined relative movement of the bifurcations to prevent energization of the electrodes until a predetermined pressure is applied between them.

7. A resistance welding machine comprising, a frame having a split base with an integral upright yoke intermediate the split portion at one end, an upright pillar secured between the yoke and base in insulated relation, an upper electrode support adjustably clamped to the pillar, a lower electrode support pivotally supported between the portions of the split base about an axis transverse of the longitudinal axis of the pillar, said support being split in a plane parallel to the axis of support to provide upper and lower forks on the end remote from the electrode, an operating lever pivotally mounted on the base, a toggle link connecting the lever to the upper fork, and a switch mounted on the lower fork actuable in response to deformation of the upper fork toward the lower fork to connect the electrode supports to a source of welding current.

8. A resistance spot welding machine comprising, a frame having an elongated lower electrode support pivotally mounted therein for movement in a vertical plane about a transverse axis, said support being split in a horizontal plane on the end remote from the electrode to provide upper and lower forks in spaced relation, an operating lever mounted in the frame pivotal about an axis parallel to and below the axis of the electrode support pivot and having an end extending above the forks of the electrode support, a toggle link connecting the upper end of the operating lever and the upper fork provided with projecting lugs for engaging the operating lever to limit movement thereof, an upper electrode support positioned in predetermined operating relation to the lower electrode support, switch means mounted on one of the forks for effecting connection of the electrode supports to a source of electrical energy, and means mounted on the other fork adjustable to operate the switch means when a predetermined deformation exists between the two forks.

FOSTER R. WOODWARD.

REFERENCES CITED

The following references are of record in the file of this patent:

UNITED STATES PATENTS

| Number | Name | Date |
|---|---|---|
| 1,292,921 | Thornblade | Jan. 28, 1919 |
| 1,579,721 | Leslie | Apr. 16, 1926 |
| 1,988,537 | Bregnet | Jan. 22, 1935 |
| 2,183,908 | Gladity | Dec. 19, 1939 |

FOREIGN PATENTS

| Number | Country | Date |
|---|---|---|
| 443,437 | Great Britain | Feb. 28, 1936 |